(12) United States Patent
Wei et al.

(10) Patent No.: US 7,647,490 B2
(45) Date of Patent: Jan. 12, 2010

(54) METHOD AND APPARATUS FOR PROVIDING UPDATED SYSTEM LOCALITY INFORMATION DURING RUNTIME

(75) Inventors: Dong Wei, Granite Bay, CA (US); Toshimitsu Kani, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1226 days.

(21) Appl. No.: 10/777,438

(22) Filed: Feb. 11, 2004

(65) Prior Publication Data

US 2005/0033948 A1 Feb. 10, 2005

Related U.S. Application Data

(60) Provisional application No. 60/493,028, filed on Aug. 5, 2003.

(51) Int. Cl.
G06F 9/00 (2006.01)
(52) U.S. Cl. .............................. 713/1; 713/2
(58) Field of Classification Search .................. 713/1, 713/2, 100
See application file for complete search history.

(56) References Cited

U.S. PATENT DOCUMENTS

2003/0041271 A1 2/2003 Nalawadi et al.
2003/0235157 A1* 12/2003 Boivie et al. ................ 370/254
2004/0243534 A1* 12/2004 Culter et al. .................... 707/1

OTHER PUBLICATIONS http://www.dig64.org/specifications/DIG64v21FD04_06-12-02.pdf, "Developer'S Interface Guide FIR 64-Bit Intel Architecture-Based Servers, Version 2.1", Chapter 5, Jan. 2002.
http://devresource.hp.com/devresource/docs/techpapers/ia64/slit.pdf, "ACPI System Locality Information Tabe Interface, Version 0.9", Jun. 26, 2000.
http://h21007.www2.hp.com/dssp/files/unprotected/devresource/docs/techpapers/IA64/slit.pdf, "System Locality Information Table Interface Specification, Version 1.0", Jul. 25, 2003.

* cited by examiner

*Primary Examiner*—Thomas Lee
*Assistant Examiner*—Paul B Yanchus, III

(57) ABSTRACT

Embodiments of the invention provide a method and an apparatus to collect and dynamically update system locality information during runtime. In one method embodiment, the present invention collects system locality information at boot time to be provided to an operating system. The system locality information describes distances between devices within an integrated processing system. The operating system is then notified that a triggering event has occurred that may potentially alter the distances between devices within the integrated processing system. Upon receipt of this notification, the operating system invokes an Advanced Configuration and Power Interface (ACPI) procedure that provides updated system locality information during runtime to reflect the changes in distances between devices within the integrated processor system after the occurrence of the triggering event.

20 Claims, 5 Drawing Sheets

300

| Field | Byte Length | Byte Offset | Description |
|---|---|---|---|
| Header | | | |
| Signature | 4 | 0 | 'SLIT' Signature for the System Locality Information Table. |
| Length | 4 | 4 | Length, in bytes, of the entire System Locality Information Table. |
| Revision | 1 | 8 | 1 |
| Checksum | 1 | 9 | Entire table must sum to zero. |
| OEMID | 6 | 10 | OEM ID |
| OEM Table ID | 8 | 16 | For the System Locality Information Table, the table ID is the manufacturer model ID. |
| OEM Revision | 4 | 24 | OEM revision of System Locality InformationTable for supplied OEM Table ID. |
| Creator ID | 4 | 28 | Vendor ID of utility that created the table. For the DSDT, RSDT, SSDT, and PSDT tables, this is the ID for the ASLCompiler. |
| Creator Revision | 4 | 32 | Revision of utility that created the table. For the DSDT, RSDT, SSDT, and PSDT tables, this is the revision for the ASL Compiler. |
| Localities | 8 | 36 | Indicates the number of localities in the system. |
| Entry[0][0] | 1 | 44 | Matrix entry (0,0), contains a value of 10. |
| ... | | | |
| Entry[0][Localities-1] | | | Matrix entry (0,Localities-1) |
| Entry[1][0] | | | Matrix entry (1,0) |
| Entry[Localities-1][Localities-1] | | | Matrix entry (Localities-1,Localities-1), contains a value of 10 |

FIG. 3

METHOD AND APPARATUS FOR PROVIDING UPDATED SYSTEM LOCALITY INFORMATION DURING RUNTIME

RELATED APPLICATIONS

The present application claims priority from and herein incorporates by reference, U.S. provisional application No. 60/493,028, entitled "System Locality Information Runtime Update on Itanium Processor Family Systems", by Dong Wei, filed on Aug. 5, 2003. Furthermore, the present application incorporates by reference U.S. non-provisional application Ser. No. 09/842,969, entitled "Allocating computer resources for efficient use by a program," filed on Apr. 25, 2001, by inventors Larry McMahan, Steven Roth, James Kleeb, and Guy Kuntz, and assigned to the same assignee of the present invention.

FIELD OF INVENTION

The present invention generally relates to computer systems and more specifically to a system and method for providing dynamically updated system locality information for multi-processor systems.

BACKGROUND ART

Modern computer systems are becoming increasingly large and complex. One example of a large computer system is the multi-processor, multi-node system based on the symmetric multiprocessing (SMP) architecture. Prior Art FIG. 1 illustrates an example of an SMP based system. As shown in Prior Art FIG. 1, the typical SMP system 100 may include multiple CPUs (e.g. CPU 0, CPU 1, CPU 2, CPU 3), sharing a same bus 102 for access to a memory 104. In the present example, the CPUs also share a L3 cache 106 and Input/Output (I/O) module 108. The SMP based systems work fine for a relatively small number of CPUs. However, problems appear with the shared bus 102 when the system includes a large number (e.g. dozens) of CPUs.

An alternative architecture designed to overcome the limitations of systems using SMP architecture is the Non-Uniform Memory Access system or NUMA.

Prior Art FIG. 2 shows an example of a NUMA based system architecture. As shown in FIG. 2, in this example of a NUMA based architecture, each node in the system 200 is simply a 4-processor SMP system (e.g. CPUs 202-208 and CPUs 210-216). Each CPU in the node contains a L1 and L2 cache (not shown here), and shares a L3 cache 218 or 220, and a memory 222 or 224. Additionally, CPUs within each node 226-228 may share an I/O device 2230 or 232, and a remote cache 234 or 236.

A node is a region of memory in which every byte within a system has the same distance from each CPU. A more common definition of a node is a block memory, CPUs, and devices etc., physically located on the same bus.

By definition, in a NUMA based system, some regions of the memory require longer access time than others. This may be due to the fact that with respect to the currently running process, data stored in some areas of memory or devices that may be used during the process reside on other nodes. Thus, those parts of the system residing on other nodes or buses are referred to as remote. Correspondingly, areas of the system residing on the same bus are referred to as being local. The notion of distances between system components may be determined in terms various metrics, including hops, latency and bandwidth. The parameter "distance" may also be referred to as system locality information herein this document.

The Advanced Configuration and Power Interface (ACPI) specification was developed to establish industry common interfaces enabling robust operating system (OS)-directed motherboard device configuration and power management of both devices and entire systems. ACPI is the key element in Operating System-directed configuration and Power Management (OSPM).

Advanced Configuration and Power Interface (ACPI) specification version 1.0b assumes that the system is based on an SMP architecture and therefore does not provide the operating system (OS) with locality information about the system it runs on. Thus, the OS would have to assume an SMP architecture, even on a NUMA based system.

With the introduction of the ACPI version 2.0b, some additional proximity indications were provided through the _PXM control method. However, the _PXM method only indicates to the OSPM that certain device modules are "close". There is no description of the relative distances (e.g. memory latencies) among the device modules.

Microsoft™ designed a static data structure called SRAT (System Resources Affinity Table). It provides a snapshot of the proximity, i.e., whether a device is close, at the system firmware's handoff to the OS. However, as with the _PXM control method, no relative distance information is conveyed.

Thus, with new system architectures being built that stretch the limits of current interfaces (e.g. Plug and Play interfaces), ACPI based mechanisms are needed that can treat newer system architectures such as NUMA in a more robust, and potentially more efficient manner, allowing the OS to optimize system performance.

SUMMARY OF THE INVENTION

Embodiments of the invention provide a method and an apparatus for collecting and dynamically updating system locality information during runtime. In one method embodiment, the present invention collects system locality information at boot time to be provided to an operating system. The system locality information describes distances between devices within an integrated processing system. The operating system is then notified that a triggering event has occurred that may potentially alter the distances between devices within the integrated processing system. Upon receipt of this notification, the operating system invokes an Advanced Configuration and Power Interface (ACPI) control method that provides updated system locality information during runtime to reflect the changes in distances between devices within the integrated processor system, after the occurrence of the triggering event.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

Prior Art

Prior Art

FIG. 3 illustrates an exemplary SLIT table according to an embodiment of the present invention.

DETAILED DESCRIPTION OF THE INVENTION

Figure 1:
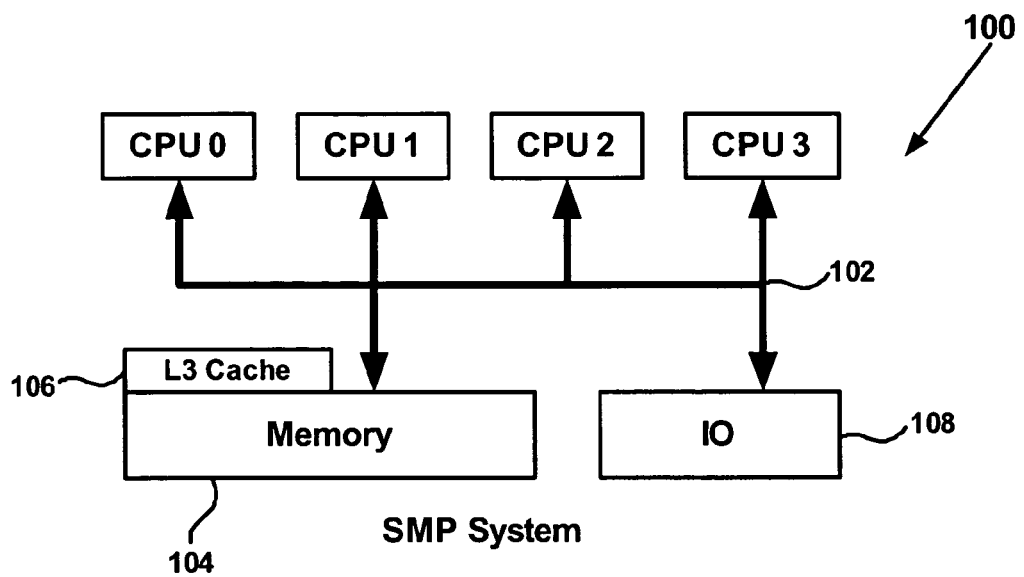
FIG. 1 illustrates an example of an SMP based system architecture.
Figure 2:
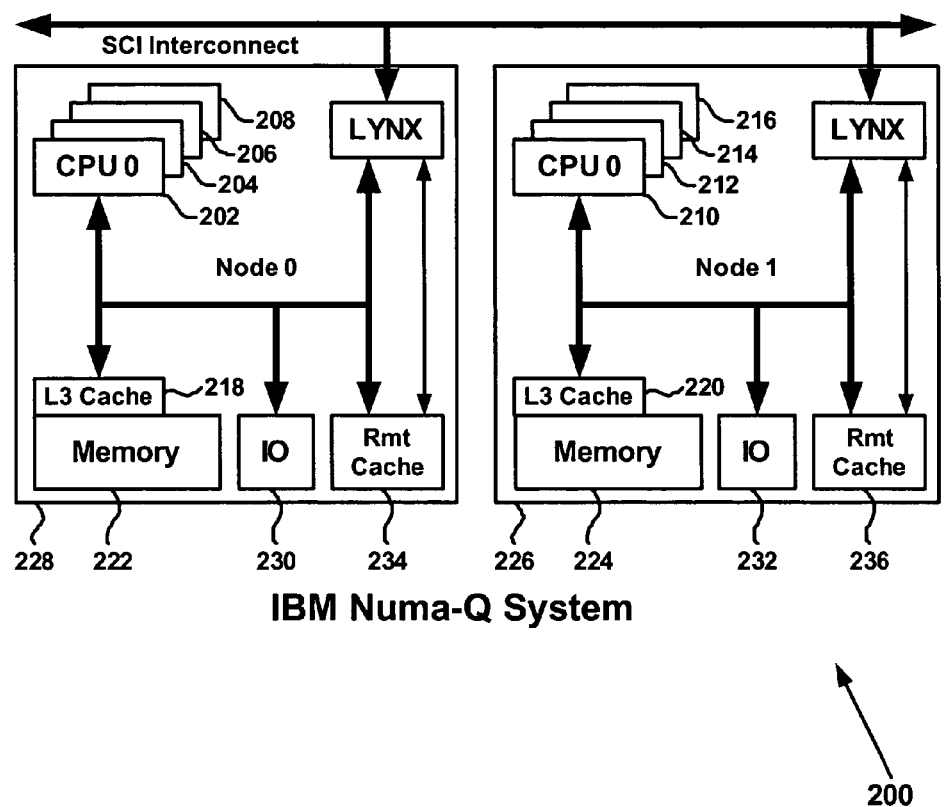
FIG. 2 shows an example of a NUMA based system architecture.

This invention provides a full solution (both the boot time snapshot and runtime update mechanism) to provide to the operating system (OS) updated system locality information describing distances between devices within an integrated processing system. Using updated system locality information, the OS may optimize the performance of the system.

The ACPI specification provides industry common interfaces enabling robust operating system (OS)-directed motherboard device configuration and power management of both devices and entire systems. ACPI is the key element in OSPM.

ACPI provides means to move power management into the OS and to use an abstract interface (ACPI) between the OS and the hardware to achieve the principal goals set forth above. As such, ACPI is an interface specification comprised of both software and hardware elements.

ACPI has evolved from the existing collection of power management BIOS code, Advanced Power Management (APM) application programming interfaces (APIs, PNP-BIOS APIs, Multiprocessor Specification (MPS) tables and so on into a well-defined power management and configuration interface specification. ACPI provides the means for an orderly transition from existing (legacy) hardware to ACPI hardware, and it allows for both ACPI and legacy mechanisms to exist in a single machine and to be used as needed.

Additionally, ACPI is the key element in implementing OSPM. ACPI-defined interfaces are intended for wide adoption to encourage hardware and software vendors to build ACPI-compatible (and, thus, OSPM-compatible) implementations. Examples of ACPI compliant system architecture may include SMP and NUMA based systems.

As mentioned above, the static data structure called SRAT provides a snapshot of the proximity parameters for the system at system firmware handoff to the operating system. The SRAT data structure only describes whether devices are close or near each other. If two devices are both described as far from a third device, no information is available to indicate whether one of them is further away from the third device than the other. Therefore, the SRAT structure is not fully describing the topology of the NUMA based system to fully realize OSPM optimization. The static SRAT table may be updated when the operating system invokes the _PXM control method. _PXM is an ACPI control method introduced in ACPI version 2.0b that provides some proximity indications for the system. This optional APCI object is used to describe proximity domains within a machine. Upon invoking _PXM, it returns an integer value that identifies the device as belonging to a specific proximity domain. The OS assumes that two devices in the same proximity domain are tightly coupled. An OS could choose to optimize its behavior based on this.

However, as previously described, SRAT and _PXM only provide a near versus far relations among the devices in the system. Therefore, no relative distance information is conveyed by either. As a result, a system based on a NUMA architecture may not run in a fully optimized manner using data provided by the SRAT structure and the _PXM control method.

A static data structure referred to as System Locality Information Table or SLIT has been developed that is applicable to a NUMA based system. The SLIT describes distances between all processors, memory controllers, and host bridges. Each module will be associated with a specific locality which will be equivalent to an SMP node. The SLIT will give units of distance between nodes. The units of distance will be relative to the SMP or intra-node distance. The static SLIT provides a snapshot of the system locality information at the system firmware's handoff to the OS. The SLIT table is described in further detail in the U.S. patent application Ser. No. 09/842,969, entitled "Allocating computer resources for efficient use by a program," filed on Apr. 25, 2001, by Larry McMahan et al., and is hereby incorporated by reference as background material.

FIG. 3 illustrates an exemplary SLIT 300 according to an embodiment of the present invention. This table gives units of distance between all processors, memory controllers, and host bridges. Each module is associated with a specific locality which is equivalent to an SMP node.

As shown in FIG. 3, the SLIT 300 includes entries that correspond to a matrix of distances, with row i of the matrix indicating the distance from locality i to every locality (including itself). SLIT 300 includes a field called "Localities." The locality indices for each locality range from 0 to Localities−1.

SLIT 300 can be viewed as a matrix of distances. SLIT 300 will give units of distance between nodes. The units of distance will be relative to the SMP intra-node distance. In one embodiment, SMP distances will arbitrarily have a value of 10. In one exemplary implementation of SLIT 300, each entry in the SLIT 300 is a one byte unsigned integer. To get the distance from locality i to locality j, the value i*(locality)+j is calculated (read from the SLIT 300). Except for the distances from a locality to itself, each distance is stored twice in the matrix. The diagonal elements of the matrix, the distances from a locality to itself, which are the SMP distances are all given an arbitrary value of 10. The distances for the non-diagonal elements are scaled to be relative to the SMP distance, so, for example, if the distance from locality i to locality j is 2.4 times the SMP distance, a value of 24 would be stored in the table entry (cell) i*(localities)+j and in j*(localities)+i. If a locality is unreachable from another, a value of 255 (0xFF) will be stored in its corresponding table entry. Values of 0-9 are reserved.

SLIT 300 is a significant step to help the OS to optimize its performance on a NUMA based system. However, newer systems built today are highly available, allowing the user to rebalance the workload or perform online device replacement and/or deconfiguration without having to shut down the system. When faced with these dynamic online reconfigurations, the SLIT data may become stale and non longer useful. Not only there can be new modules/localities added, but also existing relative distances between modules/localities may change as a result of an addition or deletion of a system cell or device.

Figure 4:
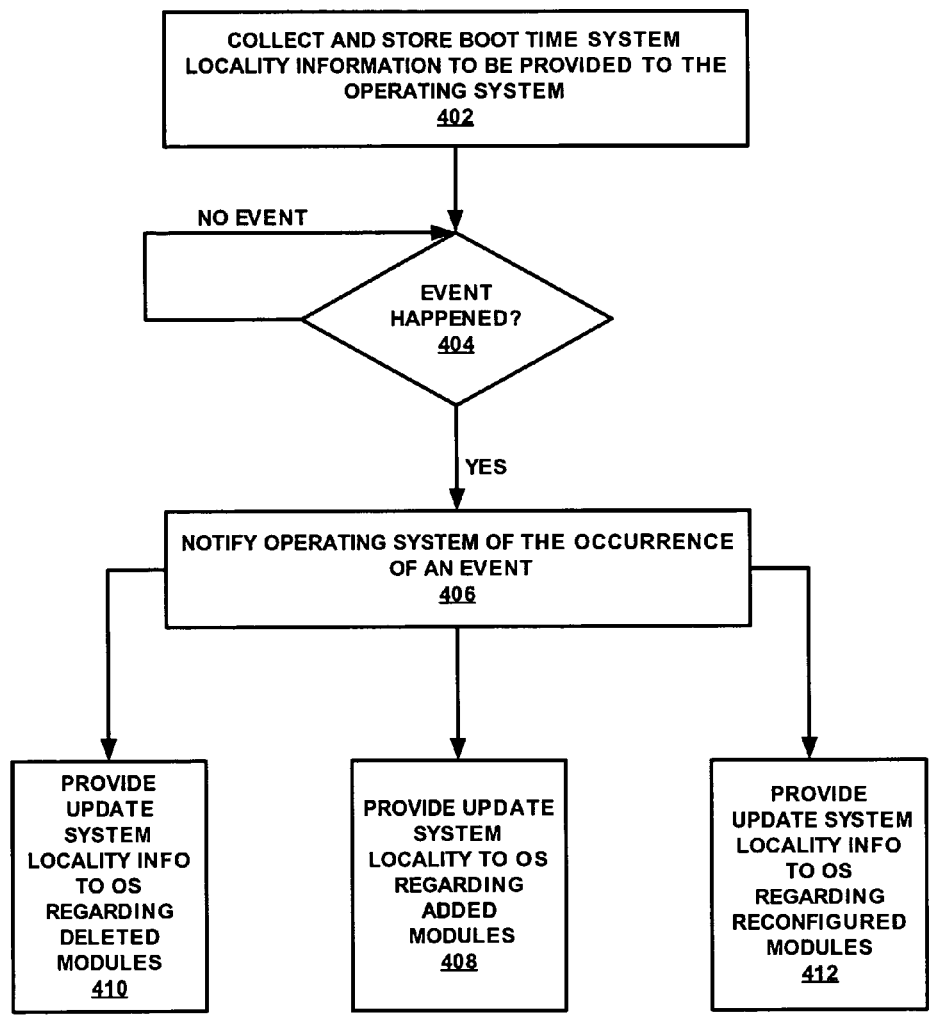
FIG. 4 is a flow chart of a method for updating system locality information according to an embodiment of the present invention.

FIG. 4 is a flow chart of a method for updating system locality information according to an embodiment of the present invention. As shown in FIG. 4, in a first step 402, system locality information is collected at boot time and provided to the operating system. At boot time, when the firmware hands off control of the system to the operating system, system locality information collected by the firmware is received by the OS in a database similar to the SLIT data structure, for storage and future use.

According to embodiments of the present invention, a firmware interface structure acts as an interface between the hardware and the operating system, facilitating communication and data transfer between the two. Thus, the firmware interface structure is used to communicate system locality information to the operating system.

In one embodiment of the present invention based on the ACPI standard, the system locality information interface structure is a SLIT. The SLIT is an ACPI structure corresponding to a non-SMP based system architecture.

Referring to FIG. 4, in step 404 the occurrence of an event may be detected. The events of interest that may affect system locality information collected at boot time includes online device or cell addition (hot plug), online deletion, and dynamic reconfiguration of the system.

In operation 406, the operating system is notified of the occurrence of the triggering event that may potentially alter the system locality information collected at boot time, in the SLIT. In one embodiment of the present invention, in the case of an online addition, the firmware notifies the OS using a bus check notification, performed on a device object to indicate to the OS that a triggering event has occurred. In the case of an online deletion, the OS is notified by an Eject Request notification. Finally, in the case of a dynamic reconfiguration of the system, the platform (firmware) may send a SLI Update notification to the OS to indicate that a dynamic reconfiguration has occurred.

Since the data in the SLIT is only collected and provided to the operating system, at boot time, a mechanism for updating the data is needed to prevent the system locality information to become stale after the occurrence of an event affecting relative distances of modules or cells in the integrated system.

In operation 408, in the case where the triggering event was an online addition or hot plug of a device, the Bus Check notification performed by the firmware is received by the OS, indicating to the OS that it needs to perform a re-enumeration operation (a Plug and Play re-enumeration in one embodiment) on the device tree starting from the point where it has been notified. Thus, the OS invokes all _SLI control methods associated with the added localities.

The device tree refers to an ACPI namespace that is a hierarchical tree structure in OS-controlled memory that contains named objects. These objects may be data objects, control method objects, bus/device package objects, and so on. The OS dynamically changes the contents of the namespace at run-time by loading and/or unloading definition blocks from the ACPI Tables that reside in the ACPI BIOS. All the information in the ACPI Namespace comes from the Differentiated System Description Table (DSDT), which contains the Differentiated Definition Block, and one or more other definition blocks.

Referring back to operation 408, after the receipt of the Bus Check notification, the operating system may invoke an ACPI control method associated with the added localities, in order to obtain updated system locality information. In one embodiment, the invoked control method is a _SLI object associated with the added locality.

In one embodiment of the present invention, the newly collected system locality information may be used to replace the existing values in the cells corresponding to the affected localities.

In an alternative embodiment, the SLIT image stored in the OS database may be modified by adding or deleting rows, as a result of the new by the new system locality information. In yet another embodiment, the completely new SLIT may be created in response to the changes in the system locality information. However, the recreation of the entire SLIT after each triggering event may unnecessarily consume large amounts of processing resources.

Referring back to FIG. 4, in operation 410, in the case of an online deletion, the OS is notified using an Eject request notification, informing the OS of the need to perform a Plug and Play ejection operation. So, in response to the Eject request notification, the OS needs to remove the system locality information corresponding to the removed modules from its internal data structure.

In operation 412, in the case of a dynamic reconfiguration, the platform may send a SLI Update notification to the a locality, to indicate to the OS that it needs to invoke the _SLI objects associated with the localities on the device tree starting from the point where it has been notified. The SLI Update is a control method according to the ACPI specification that may be used in one embodiment to notify the OS of the occurrence of a dynamic reconfiguration. Upon the receipt of the SLI Update notification, the OS may invoke the _SLI objects associated with the localities on the device tree starting from the point where it has been notified.

Thus, by performing either operation 408, 410, or 412, the OS may update system locality information affected as the result of a hot plug, an online deletion or a dynamic reconfiguration, respectively.

Figure 5:
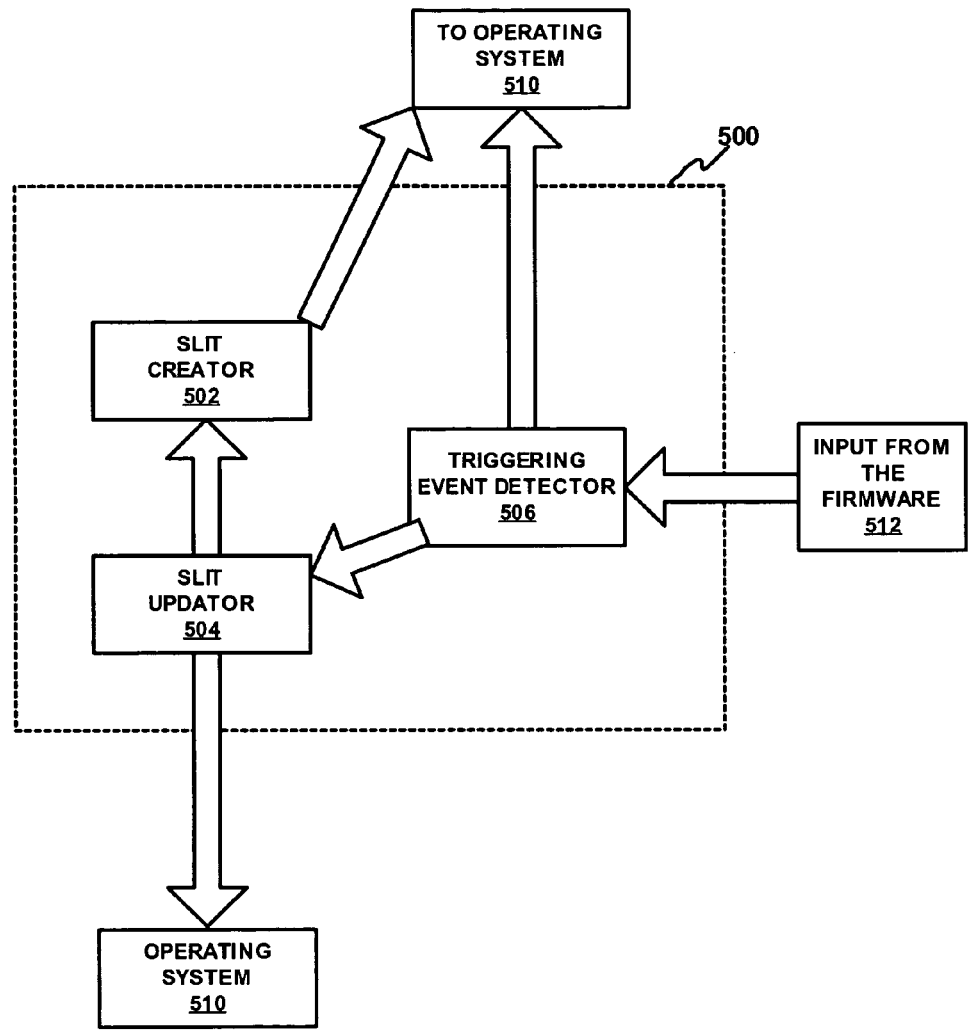
FIG. 5 is a block diagram of a system for updating system locality information according to an embodiment of the present invention.

FIG. 5 is a block diagram of a system for updating system locality information according to an embodiment of the present invention. The system locality updator system 500 includes a SLIT creator 502, a SLIT updator 504, and a triggering event detector 506.

Upon the occurrence of an event, the triggering event detector 506 receives an input from the firmware 512, indicating that an event has occurred that may potentially have changed the system locality information provided to the OS 510 using the SLIT structure.

In one embodiment, the system locality information or data is collected at system boot time, and the data is provided to OS 510 in a structured format such as the SLIT. In one embodiment, the SLIT is created by the SLIT creator 502.

The triggering event detector 506 indicates to the OS 510, the occurrence of a triggering event. In one embodiment, the OS 510 is informed of the type of triggering event detected by the type of message that is sent to the OS 510. In one embodiment, in the case of an online addition, the firmware sends a Bus Check Notification to the OS 510 through the triggering event detector 506. In the case of an online deletion, the firmware may send an Eject Request notification to the OS 510 through the triggering event detector 506. In the case of a dynamic reconfiguration of the system, the firmware may send a SLI Update notification to the OS 510, through the triggering event detector.

In one embodiment of the present invention, upon the receipt of the notification of the occurrence of a triggering event, the OS 510 may direct a SLIT updator 504 to collect new system locality information starting from point on the device tree the indication was triggered. In one embodiment, in the case of an online addition, the OS performs a Plug and Play re-enumeration is performed and the SLIT updator 504 is directed to update system locality information for the affected modules or cells by invoking a _SLI control method. The _SLI control method is an optional ACPI object that can be associated with each of the locality i and returning a buffer that contains the distances for the affected localities. In one embodiment, the _SLI control method may be tied to the _PXM control method in that the _PXM would describe the system locality and the _SLI would provide the relative distance information among the localities. In an alternative embodiment, the new system locality information provided by the SLIT updator 504 is used to recreate a new SLIT through the SLIT creator 502, and the modified or new SLIT is provided to the OS 510.

In the case of the detection of an online deletion, the SLIT updator 504 is directed by the OS 510 to perform a Plug and Play ejection operation, removing the system locality information from its internal data structure for removed localities.

In the case of a dynamic reconfiguration of the system, the OS 510 may direct the SLIT updator 504 to perform an update operation by invoking a _SLI control method and collecting the system locality information related to the affected modules, devices or cells.

The teachings of the various embodiments of the present invention allow for the collection and online updating of system locality information for non-SMP based system architecture. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for providing updated system locality information (SLI) during runtime comprising:
    collecting system locality information at boot time to be provided to an operating system, said system locality information describing distances between devices within an integrated processing system;
    notifying said operating system that a triggering event has occurred, wherein said triggering event potentially alters said system locality information; and
    providing said updated system locality information during said runtime to said operating system upon a request from said operating system, said updated system locality information reflecting said distances between said devices within said integrated processing system after occurrence of said triggering event.

2. The method of claim 1 further comprising:
    creating a system locality information table (SLIT), wherein said SLIT is populated with device distances collected at boot time.

3. The method of claim 2 wherein said notification of said operating system of an addition causes said operating system to invoke a process for updating said SLIT.

4. The method of claim 3 wherein data for said update of said SLIT is provided to said operating system upon an invocation of an Advanced Configuration and Power Interface (ACPI) object.

5. The method of claim 4 wherein said ACPI object is _SLI.

6. The method of claim 1 wherein said triggering event is based on an online addition of a device.

7. The method of claim 6 wherein said notification of said online addition is through a Bus Check notification.

8. The method of claim 1 wherein the triggering event is based on an online deletion of a processor device.

9. The method of claim 8 wherein said notification of said online deletion is through an Eject Request notification.

10. The method of claim 1 wherein the triggering event is based on an online reconfiguration of said integrated processing system, wherein said online reconfiguration affects distances between devices within said integrated processing system.

11. The method of claim 10 wherein said notification of said online reconfiguration is via a device that affected said distances.

12. The method of claim 11 wherein said notification of said online reconfiguration uses an ACPI object.

13. The method of claim 12 wherein said object is SLI Update.

14. The method of claim 3 wherein said update of said SLIT is by recreating a new table.

15. The method of claim 3 wherein said update of said SLIT is by augmenting and populating augmented cells with new system locality information.

16. The method of claim 3 wherein said update of said SLIT is by reducing and populating said SLIT with new system locality information.

17. The method of claim 3 wherein said update of said SLIT is by updating existing cells within said SLIT with new system locality information.

18. A computer program embodied on a computer readable medium for providing dynamically updated system locality information, the computer program causing a computer to perform the steps of:
    creating a system locality information table, said system locality information table being populated with boot time system locality information, wherein said system locality information table describes distances between devices within an integrated processing system; and
    updating said system locality information table upon receipt of a notification that a triggering event has occurred, wherein said triggering event may potentially alter said distances between said devices within said integrated processing system.

19. The computer program of claim 18 wherein said computer program further causes said computer to:
    invoke a bus check notification upon an online addition of a device, wherein said bus check notification indicates to said operating system that a re-enumeration of a device tree needs to be performed, and wherein said operating system invokes a _SLI procedure that returns updated system locality information resulting from said online addition;
    invoke an Eject Request notification upon an online deletion of a device, wherein said Eject Request notification indicates to said operating system that a re-enumeration of a device tree needs to be performed, and wherein said operating system invokes a _SLI procedure that returns updated system locality information resulting from said online deletion; and
    invoke an SLI Update notification upon an online reconfiguration of said integrated processing system, wherein said SLI Update notification indicates to said operating system that a re-enumeration of a device tree needs to be performed, and wherein said operating system invokes a _SLI procedure associated with a device sending said SLI Update notification that returns updated system locality information resulting from said online reconfiguration.

20. An apparatus for updating system locality information comprising:
    a system locality information table (SLIT) creator for creating a SLIT coupled to an operating system, said SLIT being populated with boot time system locality information, wherein said system locality information describes distances between devices within an integrated processing system;

a triggering event detector coupled to said operating system, said triggering event detector capable of detecting an occurrence of a triggering event, where said triggering event may potentially alter said distances between said devices within an integrated processing system; and a SLIT updator coupled to said operating system and further coupled to said triggering event detector, wherein, upon a receipt of a notification of an occurrence of said triggering event from said triggering event detector, said SLIT updator provides said updated system locality information to said operating system based on said altered distances between said devices of said integrated processing system.

* * * * *